(12) United States Patent
Lu et al.

(10) Patent No.: US 11,357,027 B2
(45) Date of Patent: Jun. 7, 2022

(54) UPLINK GRANT-FREE TRANSMISSION METHOD IN URLLC, TERMINAL SIDE DEVICE AND NETWORK SIDE DEVICE

(71) Applicant: VIVO MOBILE COMMUNICATION CO., LTD., Chang'an Dongguan (CN)

(72) Inventors: Zhi Lu, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 162 days.

(21) Appl. No.: 16/631,648

(22) PCT Filed: Aug. 2, 2018

(86) PCT No.: PCT/CN2018/098301
§ 371 (c)(1),
(2) Date: Jan. 16, 2020

(87) PCT Pub. No.: WO2019/024891
PCT Pub. Date: Feb. 7, 2019

(65) Prior Publication Data
US 2020/0178273 A1 Jun. 4, 2020

(30) Foreign Application Priority Data
Aug. 3, 2017 (CN) .......................... 201710656316.X

(51) Int. Cl.
*H04W 4/00* (2018.01)
*H04W 72/12* (2009.01)
(Continued)

(52) U.S. Cl.
CPC ....... *H04W 72/1268* (2013.01); *H04L 1/0018* (2013.01); *H04L 1/1812* (2013.01);
(Continued)

(58) Field of Classification Search
CPC ......... H04W 72/0413; H04W 72/1284; H04W 72/1268; H04L 1/1819; H04L 1/1822; H04L 1/1887; H04L 1/189
See application file for complete search history.

(56) References Cited

U.S. PATENT DOCUMENTS

2017/0171842 A1 6/2017 You et al.
2017/0332358 A1* 11/2017 Park .................. H04W 72/1289
(Continued)

FOREIGN PATENT DOCUMENTS

CN 105979597 A 9/2016
CN 106255215 A 12/2016
(Continued)

OTHER PUBLICATIONS

1st Chinese Office Action for Chinese Application No. 201710656316.X, dated Jul. 31, 2019 (Jul. 31, 2019)—8 pages (English translation—6 pages).

(Continued)

*Primary Examiner* — Bo Hui A Zhu
(74) *Attorney, Agent, or Firm* — Culhane Meadows PLLC; Stephen J. Weed

(57) ABSTRACT

The present disclosure provides an uplink grant-free transmission method in Ultra Reliable & Low Latency Communication (URLLC), a terminal side device and a network side device. The uplink grant-free transmission method includes: receiving a configuration parameter, the configuration parameter including first information indicating a correspondence between time-domain resources for URLLC uplink transmission and identifiers of Hybrid Automatic Repeat reQuest (HARQ) processes; and after the arrival of a
(Continued)

URLLC service, transmitting data for the URLLC service using a corresponding HARQ process on an available time-domain resource for the URLLC uplink transmission.

20 Claims, 5 Drawing Sheets

(51) Int. Cl.
    *H04L 1/00*         (2006.01)
    *H04L 1/18*         (2006.01)
    *H04W 72/04*      (2009.01)

(52) U.S. Cl.
    CPC ....... *H04L 1/1887* (2013.01); *H04W 72/0413* (2013.01); *H04W 72/1284* (2013.01)

(56) References Cited

U.S. PATENT DOCUMENTS

| | | | |
|---|---|---|---|
| 2018/0139774 A1* | 5/2018 | Ma | H04W 72/1289 |
| 2019/0320450 A1 | 10/2019 | Li et al. | |
| 2021/0136729 A1* | 5/2021 | Yasukawa | H04W 72/02 |

FOREIGN PATENT DOCUMENTS

| | | |
|---|---|---|
| CN | 106385709 A | 2/2017 |
| CN | 106507486 A | 3/2017 |
| CN | 106550439 A | 3/2017 |

OTHER PUBLICATIONS

International Preliminary Report on Patentability for International Application No. PCT/CN2018/098301, dated Feb. 13, 2020 (Feb. 13, 2020)—6 pages.

International Search Report and Written Opinion for International Application No. PCT/CN2018/098301 dated Sep. 27, 2018 (Sep. 27, 2018)—9 pages.

Zte et al., "Basic Grant-free Transmission for URLLC," R1-1701594, 3GPP TSG RAN WG1 Meeting #88, Athens Greece Feb. 13-17, 2017 (Feb. 13, 2017), 8 pages.

Zte et al., "HARQ for URLLC UL Grant-free transmission" R1-1704428, 3GPP TSG RAN WG1 Meeting #88bis, Spokane, USA Apr. 3-7, 2017 (Apr. 3, 2017), 5 pages.

Extended European Search Report for European Application No. 18842295.0, dated Jul. 20, 2020 (Jul. 20, 2020)—10 pages.

Fujitsu: "Discussions on HARQ for grant-free transmission," R1-1710239, 3GPP TSG RAN WG1 NR Ad-Hoc#2, Qingdao, China, Jun. 27, 2017, 4 pages.

Huawei, HiSilicon: "UE identification and HARQ combining for grant-free transmissions," R1-1709992, 3GPP TSG RAN WG1 NR Ad Hoc Meeting, Qingdao, China, Jun. 27, 2017, 6 pages.

Nokia, Alcatel-Lucent Shanghai Bell: "UE identification and HARQ for URLLC UL grant-free," R1-1710994, 3GPP TSG-RAN WG1 Ad-Hoc NR#2, Qingdao, China, Jun. 27, 2017, 5 pages.

Vivo: "Discussion on UL grant-free transmission," R1-1710380, 3GPP TSG RAN WG1 NR Ad-Hoc#2, Qingdao, China, Jun. 27, 2017, 5 pages.

\* cited by examiner

UPLINK GRANT-FREE TRANSMISSION METHOD IN URLLC, TERMINAL SIDE DEVICE AND NETWORK SIDE DEVICE

CROSS-REFERENCE TO RELATED APPLICATION

The present application is the U.S. national phase of PCT Application No. PCT/CN2018/098301 filed on Aug. 2, 2018, which claims a priority of the Chinese patent application 201710656316.X filed on Aug. 3, 2017, which are incorporated herein by reference in their entirety.

TECHNICAL FIELD

The present disclosure relates to the field of communication technology, in particular to an uplink grant-free transmission method in Ultra Reliable & Low Latency Communication (URLLC), a terminal side device and a network side device.

BACKGROUND

As compared with a conventional mobile communication system, a $5^{th}$-Generation (5G) mobile network needs to adapt a wider variety of scenarios and service requirements. Principal 5G service scenarios include Enhance Mobile Broadband (eMBB), URLLC and Massive Machine Type Communication (mMTC). In these scenarios, there are such requirements as high reliability, low latency, large bandwidth and wide coverage on the communication system.

For services in some scenarios, the low latency and high reliable transmission is required. In order to ensure the low latency, as effective measures, a length of a symbol duration and a loopback delay are reduced. In order to ensure the high reliable transmission, it is necessary to take some diversity transmission mechanisms into consideration, e.g., time diversity, space diversity and code domain diversity.

In the related art, for the uplink grant-free transmission in the URLLC, a 5G node B (gNB) may configure some resources or parameters. Once upon a service for a User Equipment (UE) has arrived, it may be transmitted on the configured resources, so as to reduce the delay for grant scheduling. The uplink grant-free in the URLLC may support a plurality of Hybrid Automatic Repeat reQuest (HARQ) processes. However, due to randomness of the arrival of a URLLC service, it is impossible for the gNB to know which HARQ process is actually used by the UE.

SUMMARY

In one aspect, the present disclosure provides in some embodiments an uplink grant-free transmission method in URLLC for a terminal side device, including: receiving a configuration parameter, the configuration parameter including first information indicating a correspondence between time-domain resources for URLLC uplink transmission and identifiers of HARQ processes; and transmitting, after the arrival of a URLLC service, data for the URLLC service using a corresponding HARQ process on an available time-domain resource for the URLLC uplink transmission.

In another aspect, the present disclosure provides in some embodiments a terminal side device, including: a reception unit configured to receive a configuration parameter, the configuration parameter including first information indicating a correspondence between time-domain resources for URLLC uplink transmission and identifiers of HARQ processes; and a transmission unit configured to, after the arrival of a URLLC service, transmit data for the URLLC service using a corresponding HARQ process on an available time-domain resource for the URLLC uplink transmission.

In yet another aspect, the present disclosure provides in some embodiments a terminal side device, including a processor, and a memory configured to store therein one or more computer-executable instructions. The processor is configured to execute the one or more computer-executable instructions so as to: receive a configuration parameter, the configuration parameter including first information indicating a correspondence between time-domain resources for URLLC uplink transmission and identifiers of HARQ processes; and transmit, after the arrival of a URLLC service, data for the URLLC service using a corresponding HARQ process on an available time-domain resource for the URLLC uplink transmission.

In still yet another aspect, the present disclosure provides in some embodiments a computer-readable storage medium storing therein one or more programs. The one or more programs are executed by an electronic device having a plurality of applications, so as to: receive a configuration parameter, the configuration parameter including first information indicating a correspondence between time-domain resources for URLLC uplink transmission and identifiers of HARQ processes; and transmit, after the arrival of a URLLC service, data for the URLLC service using a corresponding HARQ process on an available time-domain resource for the URLLC uplink transmission.

In still yet another aspect, the present disclosure provides in some embodiments an uplink grant-free transmission method in URLLC for a network side device, including: transmitting a configuration parameter, the configuration parameter including first information indicating a correspondence between time-domain resources for URLLC uplink transmission and identifiers of HARQ processes; and caching, upon the receipt of data for a URLLC service, the data for the URLLC service using a corresponding HARQ process on a time-domain resource for the URLLC uplink transmission on which the data for the URLLC service has been received.

In still yet another aspect, the present disclosure provides in some embodiments a network side device, including: a transmission unit configured to transmit a configuration parameter, the configuration parameter including first information indicating a correspondence between time-domain resources for URLLC uplink transmission and identifiers of HARQ processes; and a reception unit configured to, upon the receipt of data for a URLLC service, cache the data for the URLLC service using a corresponding HARQ process on a time-domain resource for the URLLC uplink transmission on which the data for the URLLC service has been received.

In still yet another aspect, the present disclosure provides in some embodiments a network side device, including a processor, and a memory configured to store therein one or more computer-executable instructions. The processor is configured to execute the one or more computer-executable instructions so as to: transmit a configuration parameter, the configuration parameter including first information indicating a correspondence between time-domain resources for URLLC uplink transmission and identifiers of HARQ processes; and cache, upon the receipt of data for a URLLC service, the data for the URLLC service using a corresponding HARQ process on a time-domain resource for the URLLC uplink transmission on which the data for the URLLC service has been received.

In still yet another aspect, the present disclosure provides in some embodiments a computer-readable storage medium storing therein one or more programs. The one or more programs are executed by an electronic device having a plurality of applications, so as to: transmit a configuration parameter, the configuration parameter including first information indicating a correspondence between time-domain resources for URLLC uplink transmission and identifiers of HARQ processes; and cache, upon the receipt of data for a URLLC service, the data for the URLLC service using a corresponding HARQ process on a time-domain resource for the URLLC uplink transmission on which the data for the URLLC service has been received.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The present disclosure provides in some embodiments an uplink grant-free transmission method in URLLC, a terminal side device and a network side device.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

A scheme in the embodiments of the present disclosure may be applied to various communication systems, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE)/Long Term Evolution-advanced (LTE-A) system, and New Radio (NR) system.

A UE, also called as mobile terminal or mobile user device, is capable of communicating with one or more core networks via a Radio Access Network (RAN). The UE may be a mobile terminal, e.g., mobile phone (or cellular phone), or a computer having a mobile terminal, e.g., a portable, pocket-size or handheld mobile device or a mobile device built in a computer or mounted on a vehicle. The UE may exchange voice and/or data with the RAN.

A base station may be a Base Transceiver Station (BTS) in the GSM or CDMA system, a NodeB in the WCDMA system, an evolved Node B (eNB or e-NodeB) in the LTE system, or a 5G Node B (gNB), which will not be particularly defined herein. For ease of description, the gNB will be taken as an example in the following description.

Figure 1:
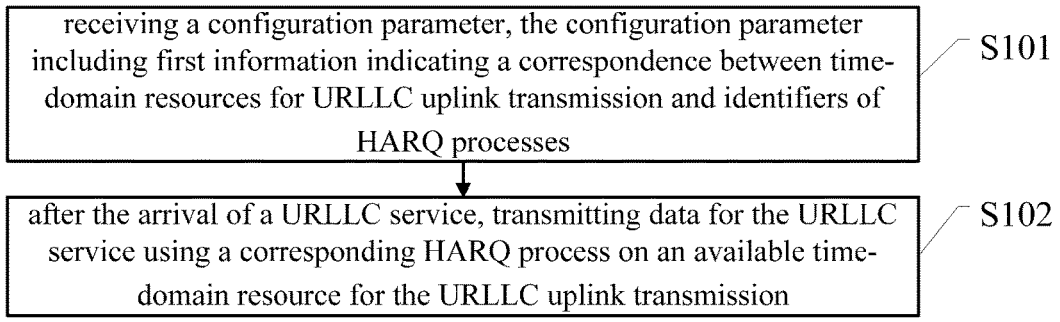
FIG. 1 is a flow chart of an uplink grant-free transmission method in URLLC according to some embodiments of the present disclosure.

As shown in FIG. 1, the present disclosure provides in some embodiments an uplink grant-free transmission method in URLLC for a terminal side device. It should be appreciated that, in the embodiments of the present disclosure, the terminal side device may be a UE. The uplink grant-free transmission method may include the following steps.

S101: receiving a configuration parameter, the configuration parameter including first information indicating a correspondence between time-domain resources for URLLC uplink transmission and identifiers of HARQ processes.

It should be appreciated that, in the embodiments of the present disclosure, the correspondence between the time-domain resources for the URLLC uplink transmission and the identifiers of the HARQ processes may be a pre-configured table.

For example, as prescribed in the configuration parameter, a plurality of time-domain resources for the URLLC uplink transmission may belong to one HARQ process. Information transmission may be performed once on each time-domain resource for the URLLC uplink transmission.

Figure 2:
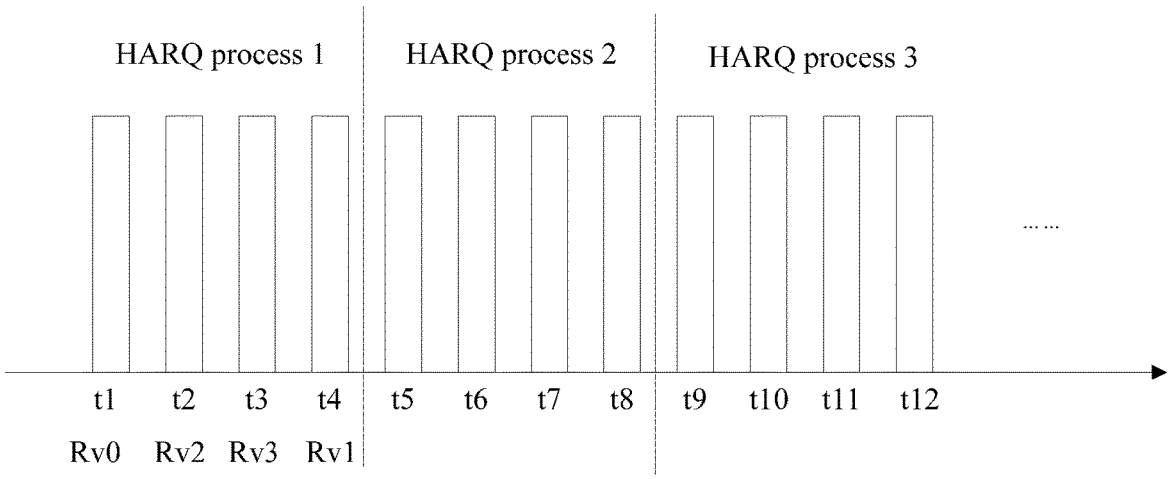
FIG. 2 is a schematic view showing a correspondence between time-domain resources for ULLC uplink transmission and HARQ processes according to some embodiments of the present disclosure.

FIG. 2 shows the correspondence between the time-domain resources for the URLLC uplink transmission and the HARQ processes. In an application scenario in FIG. 2, one HARQ process may correspond to four time-domain resources for the URLLC uplink transmission. As shown in FIG. 2, an HARQ process 1 may correspond to time-domain resources t1 to t4 for the URLLC uplink transmission, an HARQ process 2 may correspond to time-domain resources t5 to t8 for the URLLC uplink transmission, and an HARQ process 3 may correspond to time-domain resources t9 to t12 for the URLLC uplink transmission, and so on.

Of course, during the implementation, the correspondence between the time-domain resources for the URLLC uplink transmission and the identifiers of the HARQ processes may also be represented in any other mode, which will not be particularly defined herein.

In a possible embodiment of the present disclosure, the configuration parameter may further include second information indicating the quantity of transmission times. It should be appreciated that, generally the quantity of the transmission times of a same Transport Block (TB) using one HARQ process is the quantity of the transmission times of the TB. For ease of description, the quantity of the time-domain resources for the URLLC uplink transmission corresponding to one HARQ process may be just the quantity of the transmission times. For example, in the application scenario in FIG. 2, the quantity of the transmission times may be 4.

In a possible embodiment of the present disclosure, the configuration parameter may further include fourth information.

In a possible embodiment of the present disclosure, the fourth information may indicate redundancy versions of data for a URLLC service transmitted each time and a transmission order of the redundancy versions. For example, in the application scenario in FIG. 2, the fourth information may indicate four redundancy versions, i.e., Rv0 to Rv3, as well as a transmission order thereof, i.e., Rv0, Rv2, Rv3 and Rv1.

Alternatively, in a possible embodiment of the present disclosure, the fourth information may indicate redundancy versions of the data for the URLLC service on the time-domain resource for the URLLC uplink transmission corresponding to each HARQ process. For example, in the application scenario in FIG. 2, the fourth information may indicate the redundancy versions Rv0, Rv2, Rv3 and Rv1 corresponding to t1, t2, t3 and t4 respectively.

S102: after the arrival of the URLLC service, transmitting the data for the URLLC service using a corresponding HARQ process on an available time-domain resource for the URLLC uplink transmission.

It should be appreciated that, a network side device may know the identifier of the HARQ used by the UE in accordance with the correspondence between the time-domain resources for the URLLC uplink transmission and the identifiers of the HARQ processes indicated in the first information in conjunction with the time-domain resource for the URLLC uplink transmission on which the URLLC service is transmitted by the UE. In this regard, the UE and the network side device may understand the HARQ process used for the transmission of the URLLC service in a same way.

According to the embodiments of the present disclosure, through configuring the correspondence between the HARQ processes and the time-domain resources, the network side device may accurately determine the HARQ process used by the UE for the transmission when the data is transmitted by the UE to the network side device on the time-domain resource for the URLLC uplink transmission. As a result, it is able to ensure the uplink grant-free transmission of the URLLC service.

In a possible embodiment of the present disclosure, S102 may include, after the arrival of the URLLC service, transmitting data for a first TB using a first HARQ process corresponding to a first time-domain resource for the URLLC uplink transmission on a latest available first time-domain resource for the URLLC uplink transmission, and the first TB may belong to the data for the URLLC service. The uplink grant-free transmission method may further include receiving scheduling information indicating that the data for the first TB transmission using the first HARQ process is to be retransmitted on a second time-domain resource for the URLLC uplink transmission.

It should be appreciated that, the latest available first time-domain resource for the URLLC uplink transmission may refer to a latest available time-domain resource for the URLLC uplink transmission after a current time point when the URLLC service has arrived, or a next available time-domain resource for the URLLC uplink transmission after the time point when the URLLC service has arrived. The latest available first time-domain resource for the URLLC uplink transmission mentioned hereinafter may be similar to that mentioned herein, and thus will not be particularly defined.

It should be appreciated that, the second time-domain resource for the URLLC uplink transmission may be different from a time-domain resource for the uplink transmission corresponding to a second HARQ process.

In the embodiments of the present disclosure, after the arrival of the URLLC service, the data for the first TB may be transmitted on the latest available first time-domain resource for the URLLC uplink transmission using the first HARQ process. Then, when the scheduling information has been received from the network side device in accordance with the first TB, the data may be retransmitted in accordance with the scheduling information.

Figure 3:
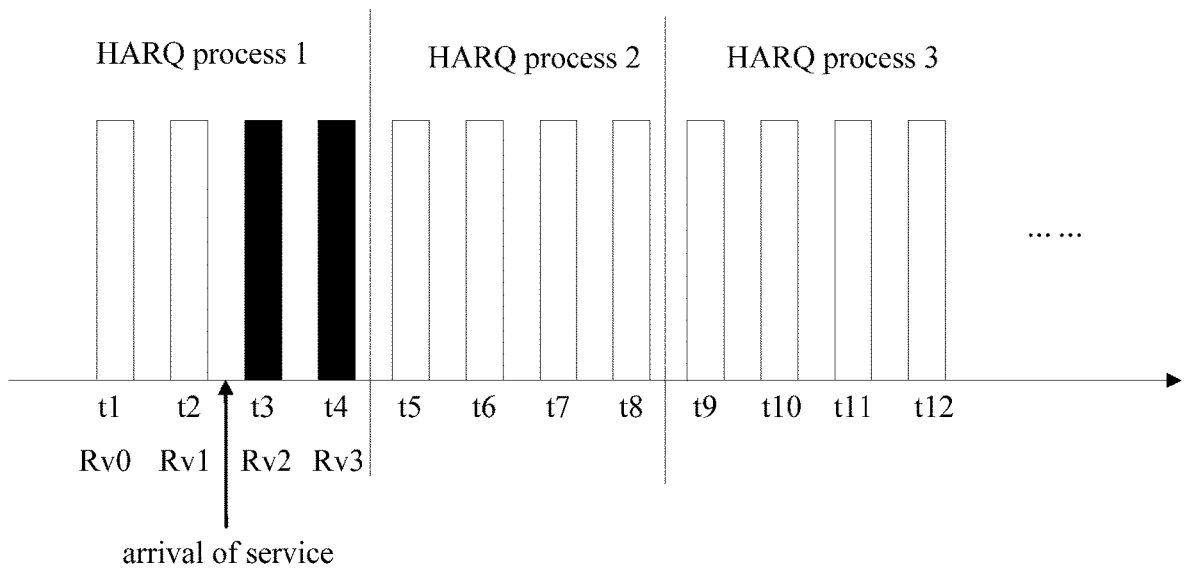
FIG. 3 is a schematic view showing the uplink grant-free transmission method in URLLC according to some embodiments of the present disclosure.

FIG. 3 is a schematic view showing the uplink grant-free transmission method in URLLC. As shown in FIG. 3, when the URLLC service has arrived between t2 and t3, the terminal side device, e.g., the UE, may transmit the TB using a latest available time-domain resource, i.e., t3. The TB may belong to the data for the URLLC service. At this time, the time-domain resources capable of being used by the HARQ process 1 may include t3 and t4, i.e., the quantity of retransmission times may be 2.

In addition, in order to ensure the reliability of the URLLC service, the reliability of the data for the URLLC service may be ensured in accordance with the scheduling information from the network side device subsequently. In other words, upon the receipt of the TB, the network side device may transmit the scheduling information to the terminal side device, so as to indicate the terminal side device to transmit the data for the same TB on the time-domain resource indicated in the scheduling information.

It should be appreciated that, the data for the same TB generally refers to a same redundancy version or different redundancy versions of the same TB. Of course, identification information about the redundancy versions may be further carried in the scheduling information from the network side device.

It should be appreciated that, generally, the network side device may schedule the terminal side device to transmit one redundancy version of a same TB in each scheduling operation. Of course, the network side device may also schedule the terminal side device to transmit a plurality of redundancy versions of the same TB in each scheduling operation.

It should be appreciated that, in the embodiments of the present disclosure, the network side device may transmit the scheduling information so as to schedule the terminal side device to transmit the TB at the quantity of transmission times equal to, or not equal to, the quantity of transmission times indicated in the configuration parameter.

In a possible embodiment of the present disclosure, S102 may include, after the arrival of the URLLC service, transmitting the data for the first TB on the latest available for time-domain resource for the URLLC uplink transmission using the first HARQ process corresponding to the first time-domain resource for the URLLC uplink transmission. The first TB may belong to the data for the URLLC service. The data transmitted using the first HARQ process may further carry third information indicating whether the first HARQ process through which the data for the URLLC service is transmitted is used to transmit the data for a same TB as the second HARQ process located immediately after the first HARQ process.

In a possible embodiment of the present disclosure, after S102, the uplink grant-free transmission method may further include, when the third information indicates that the first HARQ process is used to transmit the same TB as the second HARQ process, transmitting the data for the first TB using the first HARQ process for the quantity of remaining transmission times, on the time-domain resource for the URLLC uplink transmission corresponding to the second HARQ process. The quantity of the remaining transmission times may be the quantity of transmission times acquired by subtracting the quantity of transmission times of the first TB on the time-domain resource for the URLLC uplink transmission using the first HARQ process from the quantity of the transmission times indicated in the second information.

Figure 4:
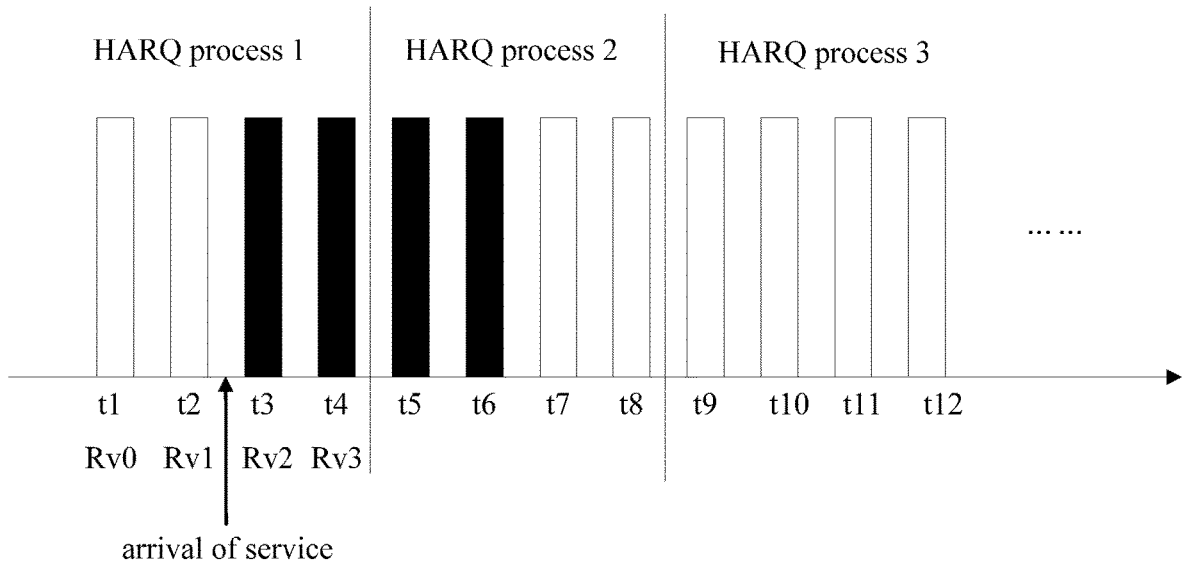
FIG. 4 is another schematic view showing the uplink grant-free transmission method in URLLC according to some embodiments of the present disclosure.

FIG. 4 is a schematic view showing the uplink grant-free transmission method in URLLC. Similar to that in FIG. 3, when the URLLC service has arrived between t2 and t3, the terminal side device, e.g., the UE, may transmit the TB using a latest available time-domain resource, i.e., t3. The TB may belong to the data for the URLLC service. At this time, the time-domain resources capable of being used by the HARQ process 1 may include t3 and t4, i.e., the quantity of retransmission times may be 2, for example.

In addition, in the embodiments of the present disclosure, apart from the data for the TB, the data transmitted through the HARQ process 1 may further include information indicating whether an adjacent HARQ process subsequent to the HARQ process 1, i.e., the HARQ process 2, and the HARQ process 1 are used to transmit the data for the same TB. Of course, it should be appreciated that, in the embodiments of the present disclosure, a Demodulation Reference Signal (DMRS) sequence or Uplink Control Information (UCI) may carry the information in the time-domain resource for the uplink transmission of the data. The information may use one bit of the DMRS or occupy one bit of the UCI.

When the information included in the data transmitted through the HARQ process 1 indicates that the HARQ process 1 and the HARQ process 2 are used to the transmit the data for the same TB, the terminal side device may transmit the data for the TB transmission using the HARQ process 1 on the time-domain resource for the uplink transmission corresponding to the HARQ process 2, and the quantity of the times of the same TB transmission using the HARQ process 1 and the HARQ process 2 may be equal to the quantity of the transmission times. For example, in a scenario in FIG. 4, the other redundancy versions of the same TB may be transmitted using the HARQ process 1 on the two time-domain resources for the uplink transmission, i.e., t5 and t6.

In another possible embodiment of the present disclosure, subsequent to S102, the uplink grant-free transmission method may further include, when the third information indicates that the first HARQ process and the second HARQ process are used to transmit the data for the same TB, transmitting data for a first TB using the first HARQ process on all the time-domain resource for the URLLC uplink transmission corresponding to the second HARQ process.

Figure 5:
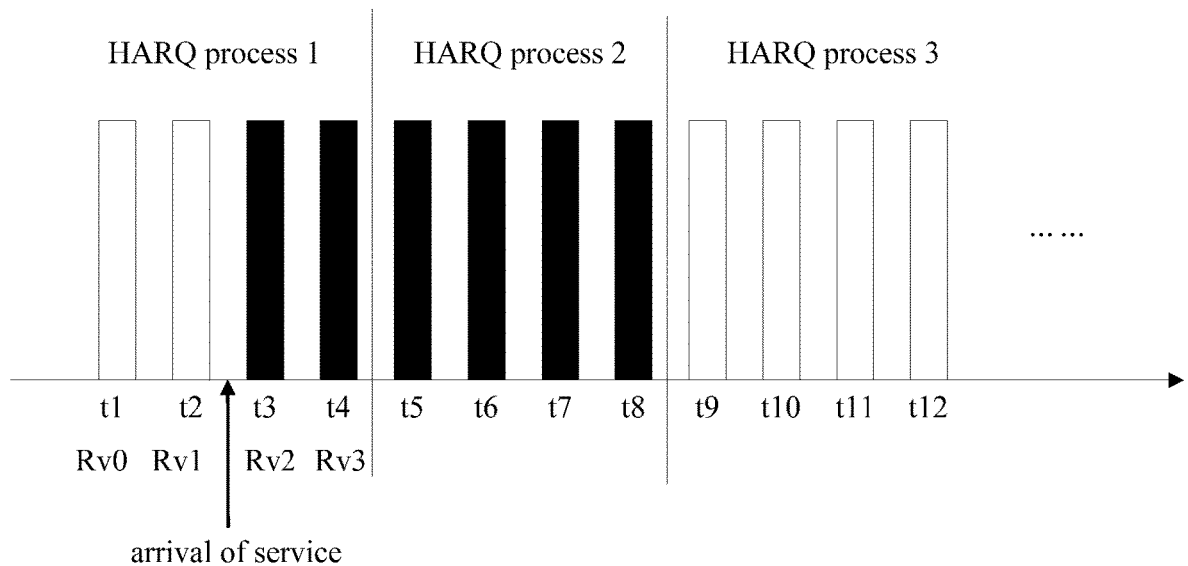
FIG. 5 is yet another schematic view showing the uplink grant-free transmission method in URLLC according to some embodiments of the present disclosure.

FIG. 5 is a schematic view showing the uplink grant-free transmission method in URLLC. Similar to that in FIG. 3, when the URLLC service has arrived between t2 and t3, the terminal side device, e.g., the UE, may transmit the TB using a latest available time-domain resource, i.e., t3. The TB may belong to the data for the URLLC service. At this time, the time-domain resources capable of being used by the HARQ process 1 may include t3 and t4, i.e., the quantity of retransmission times may be 2, for example.

Similar to the application scenario in FIG. 4, in the embodiments of the present disclosure, apart from the data for the TB, the data transmitted through the HARQ process 1 may further include information indicating whether an adjacent HARQ process subsequent to the HARQ process 1, i.e., the HARQ process 2, and the HARQ process 1 are used to transmit the data for the same TB.

When the information included in the data transmitted through the HARQ process 1 indicates that the HARQ process 1 and the HARQ process 2 are used to transmit the data for the same TB, the terminal side device may transmit the data for the TB transmission through the HARQ process 1 on all the time-domain resources for the uplink transmission corresponding to the HARQ process 2. For example, in a scenario in FIG. 5, the terminal side device may transmit the redundancy versions of the same TB using the HARQ process 1 on the four time-domain resources for the uplink transmission, i.e., t5 to t8, for example.

Of course, it should be appreciated that, in the embodiments of the present disclosure, the DMRS sequence or UCI may also carry one piece of information indicating whether a current HARQ process corresponding to a current time-domain resource for the uplink transmission and an adjacent HARQ process subsequent to the current HARQ process are used to transmit the data for the same TB.

In a possible embodiment of the present disclosure, S102 may include, after the arrival of the URLLC service, transmitting the data for the URLLC service using an adjacent HARQ process subsequent to an HARQ process corresponding to a current time point on a time-domain resource for the URLLC uplink transmission corresponding to the adjacent HARQ process.

Figure 6:
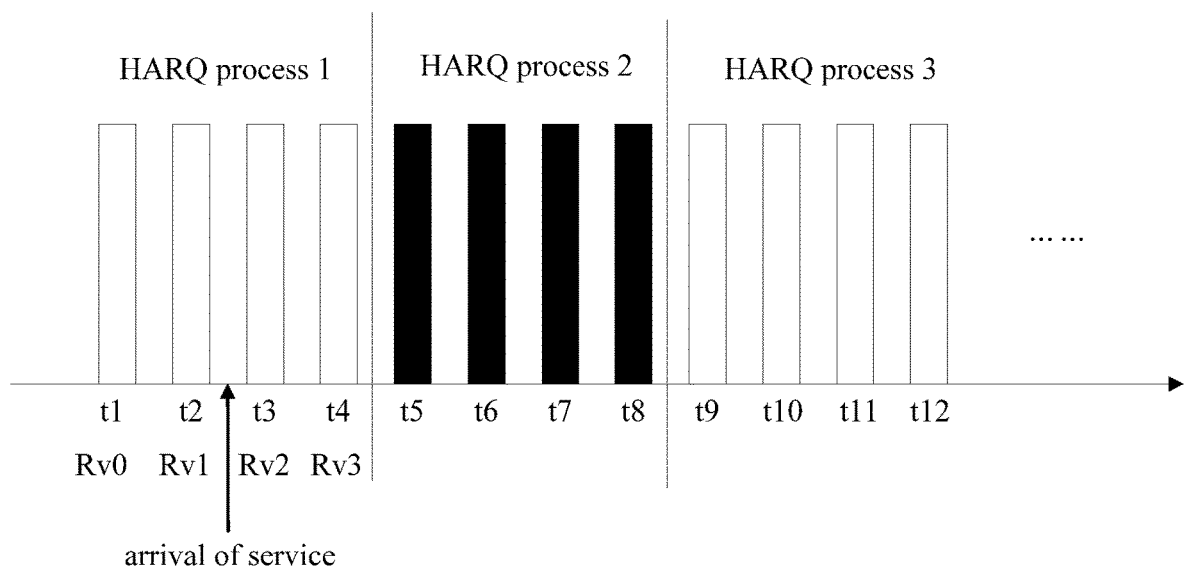
FIG. 6 is still yet another schematic view showing the uplink grant-free transmission method in URLLC according to some embodiments of the present disclosure.

FIG. 6 is a schematic view showing the uplink grant-free transmission method in URLLC. Similar to that in FIG. 3, the URLLC service has arrived between t2 and t3. In an application scenario in FIG. 6, the terminal side device may transmit the TB using an adjacent HARQ process subsequent to a HARQ process corresponding to an arrival time point of the URLLC service. To be specific, in FIG. 6, the terminal side device may transmit all the redundancy versions of the TB using the HARQ process 2 on the four time-domain resources t5 to t8 for the uplink transmission, i.e., the configured transmission times.

Figure 7:
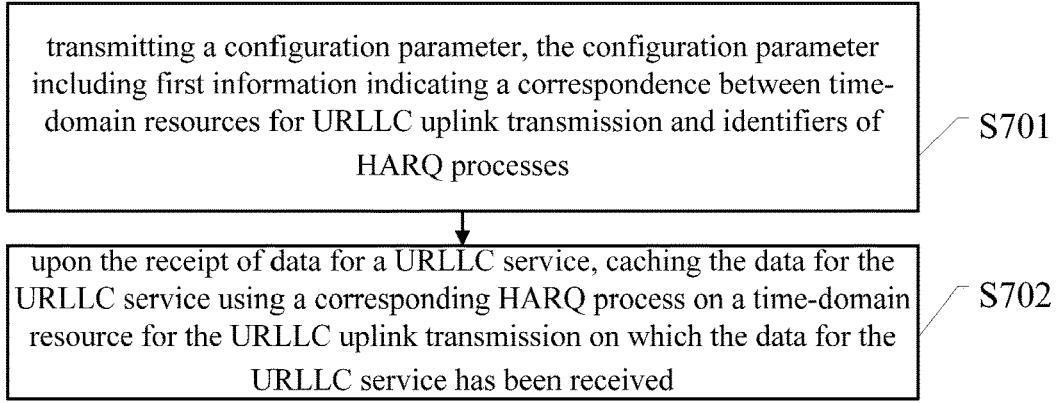
FIG. 7 is a flow chart of an uplink grant-free transmission method in URLLC according to some embodiments of the present disclosure.

As shown in FIG. 7, the present disclosure further provides in some embodiments an uplink grant-free transmission method in URLLC for a network side device. It should be appreciated that, in the embodiments of the present disclosure, the network side device may be a base station. The uplink grant-free transmission method may include the following steps.

S701: transmitting a configuration parameter, the configuration parameter including first information indicating a correspondence between time-domain resources for URLLC uplink transmission and identifiers of HARQ processes.

In a possible embodiment of the present disclosure, the configuration parameter may further include second information indicating the quantity of transmission times.

In a possible embodiment of the present disclosure, the configuration parameter may further include fourth information. In a possible embodiment of the present disclosure, the fourth information may indicate redundancy versions of data for a URLLC service transmitted each time and a transmission order of the redundancy versions. Alternatively, the fourth information may indicate redundancy versions of the data for the URLLC service on the time-domain resource for the URLLC uplink transmission corresponding to each HARQ process.

The description about the configuration parameter may refer to that mentioned in S101 in FIG. 1, and thus will not be particularly defined herein.

S702: upon the receipt of data for the URLLC service, caching the data for the URLLC service using a corresponding HARQ process on a time-domain resource for the URLLC uplink transmission on which the data for the URLLC service has been received.

According to the embodiments of the present disclosure, through configuring the correspondence between the HARQ processes and the time-domain resources, the network side device may accurately determine the HARQ process used by the terminal side device for the transmission when the data is transmitted by the terminal side device to the network side device on the time-domain resource for the URLLC uplink transmission. As a result, it is able to ensure the uplink grant-free transmission of the URLLC service.

In a possible embodiment of the present disclosure, S702 may include, when it is detected that there is the data for the URLLC service to be received on a first time-domain resource for the URLLC uplink transmission, caching data for a first TB received on the first time-domain resource for the URLLC uplink transmission using a first HARQ process corresponding to the first time-domain resource for the URLLC uplink transmission, and the first TB may belong the data for the URLLC service.

It should be appreciated that, no matter whether the TB is transmitted by the terminal side device using an HARQ process corresponding to an arrival time point of the URLLC service or using an adjacent HARQ process subsequent to the HARQ process corresponding to the arrival time point of the URLLC service, when it is detected that there is the data for the URLLC service to be received on the time-domain resource for the URLLC uplink transmission, the network side device may cache the data for the TB received on the time-domain resource for the URLLC uplink transmission using the HARQ process corresponding to the time-domain resource for the URLLC uplink transmission.

When the first TB cached using the first HARQ process has not been received correctly, the uplink grant-free transmission method may further include transmitting scheduling information indicating that the data for the first TB cached using the first HARQ process is to be retransmitted by a terminal side device on a second time-domain resource for the URLLC uplink transmission.

In the application scenario in FIG. 3, when the URLLC service has arrived between t2 and t3, the terminal side device, e.g., the UE, may transmit the TB using an HARQ process 1 on time-domain resources for the uplink transmission, i.e., t3 and t4. After it is detected that the data for the URLLC service has arrived on the time-domain resources t3 and t4 for the uplink transmission, the network side device, e.g., the base station, may cache the data for the TB using the HARQ process 1 corresponding to the time-domain resources t3 and t4 for the uplink transmission. Then, the network side device, e.g., the base station, may transmit the scheduling information to the terminal side device in accordance with a usage condition of the time-domain resources for the uplink transmission, and the scheduling information may indicate the terminal side device to transmit the data for a same TB on a time-domain resource different from the configured time-domain resource for the uplink transmission. The network side device, e.g., the base station, may cache redundancy versions of the same TB using the HARQ process 1 on the scheduled time-domain resource for the uplink transmission.

It should be appreciated that, in the embodiments of the present disclosure, the network side device may transmit the scheduling information so as to schedule the terminal side device to transmit the TB at the quantity of transmission times equal to, or not equal to, the quantity of transmission times indicated in the configuration parameter.

Of course, it should be appreciated that, the network side device may cache the data for the first TB, which has been received on the second time-domain resource for the URLLC uplink transmission, using the first HARQ process on the second time-domain resource for the URLLC uplink transmission.

In a possible embodiment of the present disclosure, the data cached using the first HARQ process may further carry third information indicating whether the first HARQ process and an adjacent second HARQ process subsequent to the first HARQ process are used to cache the data for the same TB.

In a possible embodiment of the present disclosure, S702 may include: caching the data for the first TB, which has been received on the first time-domain resource for the URLLC uplink transmission, using the first HARQ process corresponding to the first time-domain resource for the URLLC uplink transmission; and when the data cached using the first HARQ process further carries the third information indicating that the first HARQ process and the second HARQ process are used to cache the data for the same TB, caching the data for the first TB using the first HARQ process for the quantity of remaining transmission times on all the time-domain resources for the URLLC uplink transmission corresponding to the second HARQ process. The quantity of the remaining transmission times may be the quantity of transmission times acquired by subtracting the quantity of transmission times of the first TB on the time-domain resource for the URLLC uplink transmission using the first HARQ process from the quantity of the transmission times indicated in the second information.

In the application scenario in FIG. 4, after the network side device has cached the data for the TB using the HARQ process 1 on t3 and t4, the network side device may further determine that the HARQ process 2 and the HARQ process 1 are used to transmit the data for the same TB in accordance with the information carried in the cached data, and then cache the other redundancy versions of the same TB using the HARQ process 1 on the time-domain resources t5 and t6 for the uplink transmission.

Of course, it should be appreciated that, in the embodiments of the present disclosure, a received DMRS sequence of UCI may further carry information indicating whether a current HARQ process corresponding to a current time-domain resource for the uplink transmission and an adjacent HARQ process subsequent to the current HARQ process are used to transmit the data for the same TB.

In a possible embodiment of the present disclosure, S702 may include: caching the data for the first TB, which has been received on the first time-domain resource for the URLLC uplink transmission, using the first HARQ process corresponding to the first time-domain resource for the URLLC uplink transmission, the first TB belonging to the data for the URLLC service; and when the data cached using the first HARQ process further carries the third information indicating that the first HARQ process and the second HARQ process are used to cache the data for the same TB, caching the data of the first TB using the second HARQ process on all the time-domain resources for the URLLC uplink transmission corresponding to the second HARQ process.

In the application scenario in FIG. 5, after the network side device has cached the data for the TB using the HARQ process 1 on t3 and t4, the network side device may further determine that the HARQ process 2 and the HARQ process 1 are used to transmit the data for the same TB in accordance with the information carried in the cached data, and cache the redundancy versions of the same TB using the HARQ process 1 on the four time-domain resources for the uplink transmission, i.e., t5 to t8, for example.

Of course, it should be appreciated that, in the embodiments of the present disclosure, the received DMRS sequence or UCI may further carry information indicating whether the current HARQ process corresponding the current time-domain resource for uplink transmission and the adjacent HARQ process subsequent to the current HARQ process are used to transmit the data for the same TB.

Figure 8:
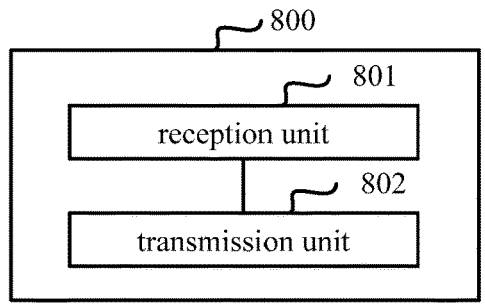
FIG. 8 is a schematic view showing a terminal side device according to some embodiments of the present disclosure.

The present disclosure further provides in some embodiments a terminal side device 800 which, as shown in FIG. 8, includes: a reception unit 801 configured to receive a configuration parameter, the configuration parameter including first information indicating a correspondence between time-domain resources for URLLC uplink transmission and identifiers of HARQ processes; and a transmission unit 802 configured to, after the arrival of a URLLC service, transmit data for the URLLC service using a corresponding HARQ process on an available time-domain resource for the URLLC uplink transmission.

According to the embodiments of the present disclosure, through configuring the correspondence between the HARQ processes and the time-domain resources, a network side device may accurately determine the HARQ process used by the UE for the transmission when the data is transmitted by the terminal side device to the network side device on the time-domain resource for the URLLC uplink transmission. As a result, it is able to ensure the uplink grant-free transmission of the URLLC service.

In a possible embodiment of the present disclosure, the configuration parameter may further include second information indicating the quantity of transmission times.

In a possible embodiment of the present disclosure, the configuration parameter may further include fourth information. In a possible embodiment of the present disclosure, the fourth information may indicate redundancy versions of data for a URLLC service transmitted each time and a transmission order of the redundancy versions. Alternatively, the fourth information may indicate redundancy versions of the data for the URLLC service on the time-domain resource for the URLLC uplink transmission corresponding to each HARQ process.

In a possible embodiment of the present disclosure, the transmission unit 802 is further configured to, after the arrival of the URLLC service, transmit data for a first TB using a first HARQ process corresponding to a first time-domain resource for the URLLC uplink transmission on a latest available first time-domain resource for the URLLC uplink transmission, and the first TB may belong to the data for the URLLC service. The reception unit 801 is further configured to receive scheduling information indicating that the data for the first TB transmission using the first HARQ process is to be retransmitted on a second time-domain resource for the URLLC uplink transmission. The transmission unit 802 is further configured to retransmit the data for the first TB using the first HARQ process on the second time-domain resource for the URLLC uplink transmission in accordance with the scheduling information from a gNB.

In a possible embodiment of the present disclosure, the transmission unit 802 is further configured to, after the arrival of the URLLC service, transmit the data for the first TB using the first HARQ process corresponding to the first time-domain resource for the URLLC uplink transmission on the latest available first time-domain resource for the URLLC uplink transmission. The first TB may belong to the data for the URLCC service, and the data transmitted using the first HARQ process may further carry third information indicating whether the first HARQ process through which the data for the URLLC service has been transmitted and an adjacent second HARQ process subsequent to the first HARQ process are used to transmit the data for the same TB.

In a possible embodiment of the present disclosure, the transmission unit 802 is further configured to, when the third information indicates that the first HARQ process and the second HARQ process are used to transmit the data for the same TB, transmit the data for the first TB using the first HARQ process on all the time-domain resources for the URLLC uplink transmission corresponding to the second HARQ process.

In another possible embodiment of the present disclosure, the transmission unit 802 is further configured to, when the third information indicates that the first HARQ process and the second HARQ process are used to transmit the data for the same TB, transmit the data for the first TB using the first HARQ process for the quantity of remaining transmission times on the time-domain resource for the URLLC uplink transmission corresponding to the second HARQ process. The quantity of the remaining transmission times may be the quantity of transmission times acquired by subtracting the quantity of transmission times of the first TB on the time-domain resource for the URLLC uplink transmission using the first HARQ process from the quantity of the transmission times indicated in the second information.

In yet another possible embodiment of the present disclosure, the transmission unit 802 is further configured to, after the arrival of the URLLC service, transmit the data for the URLLC service using an adjacent HARQ process subsequent to an HARQ process corresponding to a current time point on a time-domain resource for the URLLC uplink transmission corresponding to the adjacent HARQ process.

The terminal side device 800 may also be applied to the method in FIG. 1 and achieve the functions of the network side device mentioned hereinabove, which will not be particularly defined herein.

Figure 9:
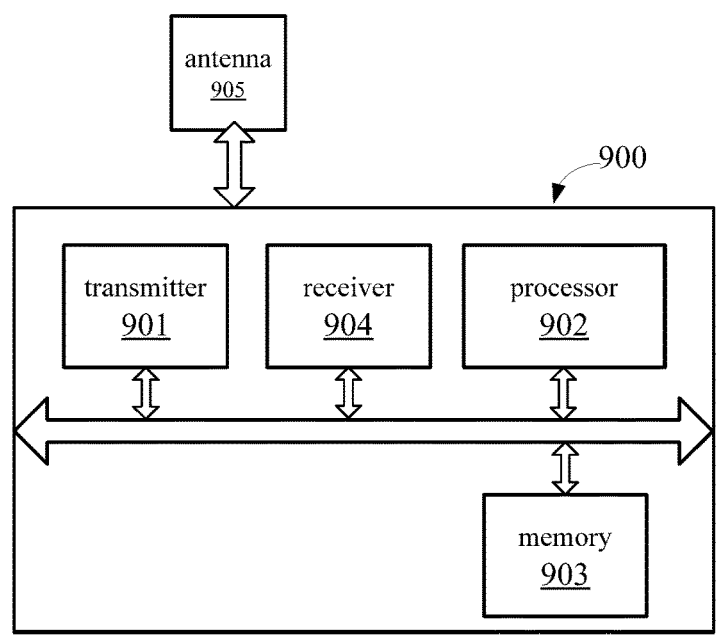
FIG. 9 is another schematic view showing the terminal side device according to some embodiments of the present disclosure.

The present disclosure further provides in some embodiments a terminal side device 900 which, as shown in FIG. 9, includes a processor 902, a memory 903, a transmitter 901 and a receiver 904. In actual use, the transmitter 901 and the receiver 904 may be coupled to an antenna 905.

The memory 903 is configured to store therein a program. To be specific, the program may include program codes, and the program codes may include computer-readable instructions. The memory 903 may include a Read-Only Memory (ROM) and a Random Access Memory (RAM), and it is configured to provide instructions and data to the processor 902. To be specific, the memory 903 may include a high-speed RAM, or a non-volatile memory, e.g., at least one magnetic disk.

The processor 902 is configured to execute the program stored in the memory 903.

To be specific, in the terminal side device 900, the processor 902 is configured to, through the receiver 904 and the transmitter 901: receive a configuration parameter, the configuration parameter including first information indicating a correspondence between time-domain resources for URLLC uplink transmission and identifiers of HARQ processes; and after the arrival of a URLLC service, transmit data for the URLLC service using a corresponding HARQ process on an available time-domain resource for the URLLC uplink transmission.

The above-mentioned method for the terminal side device in FIG. 1 may be applied to, or implemented by, the processor 902. The processor 902 may be an integrated circuit (IC) having a signal processing capability. During the implementation, the steps of the method may be realized through an integrated logic circuit of hardware in the processor 902 or instructions in the form of software. The processor 902 may be a general-purpose processor (including a Central Processing Unit (CPU), or a Network Processor (NP)), a Digital Signal Processor (DSP), an Application-Specific Integrated Circuit (ASIC), a Field Programmable Gate Array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules. The software module may be located in a known storage medium such as an RAM, a flash memory, an ROM, a Programmable ROM (PROM), an Electrically Erasable PROM (EEPROM), or a register. The storage medium may be located in the memory 903, and the processor 902 may read information stored in the memory 903 so as to implement the steps of the method in conjunction with the hardware.

The terminal side device 900 may also be applied to the method in FIG. 1 and achieve the functions of the network side device mentioned hereinabove, which will not be particularly defined herein.

The present disclosure further provides in some embodiments a computer-readable storage medium storing therein one or more programs including instructions. The instructions are executed by a portable electronic device including a plurality of applications so as to implement the method in FIG. 1, i.e., to: receive a configuration parameter, the configuration parameter including first information indicating a correspondence between time-domain resources for URLLC uplink transmission and identifiers of HARQ processes; and after the arrival of a URLLC service, transmit data for the URLLC service using a corresponding HARQ process on an available time-domain resource for the URLLC uplink transmission.

Figure 10:
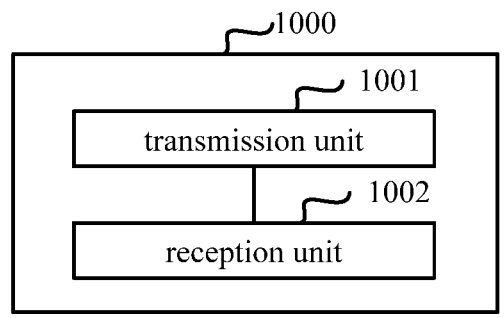
FIG. 10 is a schematic view showing a network side device according to some embodiments of the present disclosure.

The present disclosure further provides in some embodiments a network side device 1000 which, as shown in FIG. 10, includes: a transmission unit 1001 configured to transmit a configuration parameter, the configuration parameter including first information indicating a correspondence between time-domain resources for URLLC uplink transmission and identifiers of HARQ processes; and a reception unit 1002 configured to, upon the receipt of data for a URLLC service, cache the data for the URLLC service using a corresponding HARQ process on a time-domain resource for the URLLC uplink transmission on which the data for the URLLC service has been received.

According to the embodiments of the present disclosure, through configuring the correspondence between the HARQ processes and the time-domain resources, the network side device may accurately determine the HARQ process used by the terminal side device for the transmission when the data is transmitted by the terminal side device to the network side device on the time-domain resource for the URLLC uplink transmission. As a result, it is able to ensure the uplink grant-free transmission of the URLLC service.

In a possible embodiment of the present disclosure, the configuration parameter may further include second information indicating the quantity of transmission times.

In a possible embodiment of the present disclosure, the configuration parameter may further include fourth information. In a possible embodiment of the present disclosure, the fourth information may indicate redundancy versions of data for a URLLC service transmitted each time and a transmission order of the redundancy versions. Alternatively, the fourth information may indicate redundancy versions of the data for the URLLC service on the time-domain resource for the URLLC uplink transmission corresponding to each HARQ process.

In a possible embodiment of the present disclosure, the reception unit 1002 is further configured to, when it is detected that there is the data for the URLLC service to be received on a first time-domain resource for the URLLC uplink transmission, cache data for a first TB received on the first time-domain resource for the URLLC uplink transmission using a first HARQ process corresponding to the first time-domain resource for the URLLC uplink transmission, and the first TB may belong to the data for the URLLC service.

The transmission unit 1001 is further configured to transmit scheduling information indicating that the data for the first TB cached using the first HARQ process is to be retransmitted by a terminal side device on a second time-domain resource for the URLLC uplink transmission.

In a possible embodiment of the present disclosure, the reception unit 1002 is further configured to cache the data for the first TB, which has been received on the first time-domain resource for the URLLC uplink transmission, using the first HARQ process corresponding to the first time-domain resource for the URLLC uplink transmission. The first TB may belong to the data for the URLLC service, and the data cached using the first HARQ process may further carry third information indicating the first HARQ process and an adjacent second HARQ process subsequent to the first HARQ process are used to cache the data for the same TB.

In a possible embodiment of the present disclosure, the reception unit 1002 is further configured to, when the third information indicates that the first HARQ process and the second HARQ process are used to cache the data for the same TB, cache the data for the first TB using the first HARQ process on all the time-domain resources for the URLLC uplink transmission corresponding to the second HARQ process.

In another possible embodiment of the present disclosure, the reception unit 1002 is further configured to, when the third information indicates that the first HARQ process and the second HARQ process are used to cache the data for the same TB, cache the data for the first TB using the first HARQ process for the quantity of remaining transmission times on all the time-domain resources for the URLLC uplink transmission corresponding to the second HARQ process. The quantity of the remaining transmission times may be the quantity of transmission times acquired by subtracting the quantity of transmission times of the first TB on the time-domain resource for the URLLC uplink transmission using the first HARQ process from the quantity of the transmission times indicated in the second information.

The network side device 1000 may also be applied to the method in FIG. 7 and achieve the functions of the network side device mentioned hereinabove, which will not be particularly defined herein.

Figure 11:
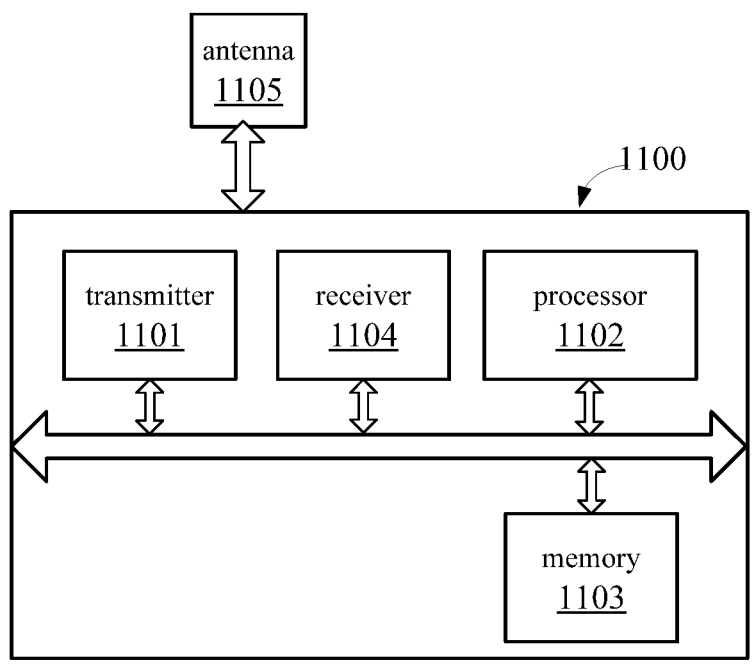
FIG. 11 is another schematic view showing the network side device according to some embodiments of the present disclosure.

The present disclosure further provides in some embodiments a network side device 1100 which, as shown in FIG. 11, includes a processor 1102, a memory 1103, a transmitter 1101 and a receiver 1104. In actual use, the transmitter 1101 and the receiver 1104 may be coupled to an antenna 1105.

The memory 1103 is configured to store therein a program. To be specific, the program may include program codes, and the program codes may include computer-readable instructions. The memory 1103 may include an ROM) and an RAM, and it is configured to provide instructions and data to the processor 1102. To be specific, the memory 1103 may include a high-speed RAM, or a non-volatile memory, e.g., at least one magnetic disk.

The processor 1102 is configured to execute the program stored in the memory 1103.

To be specific, in the network side device 1100, the processor 1102 is configured to, through the receiver 1104 and the transmitter 1101: transmit a configuration parameter, the configuration parameter including first information indicating a correspondence between time-domain resources for URLLC uplink transmission and identifiers of HARQ processes; and upon the receipt of data for a URLLC service, cache the data for the URLLC service using a corresponding HARQ process on a time-domain resource for the URLLC uplink transmission on which the data for the URLLC service has been received.

The above-mentioned method for the terminal side device in FIG. 7 may be applied to, or implemented by, the processor 1102. The processor 1102 may be an IC having a signal processing capability. During the implementation, the steps of the method may be completed through an integrated logic circuit of hardware in the processor 1102 or instructions in the form of software. The processor 1102 may be a general-purpose processor (including a CPU, or an NP), a DSP, an ASIC, an FPGA or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules. The software module may be located in a known storage medium such as an RAM, a flash memory, an ROM, a PROM, an EEPROM, or a register. The storage medium may be located in the memory 1103, and the processor 1102 may read information stored in the memory 1103 so as to implement the steps of the method in conjunction with the hardware.

The terminal side device 1100 may also be applied to the method in FIG. 7 and achieve the functions of the network side device mentioned hereinabove, which will not be particularly defined herein.

The present disclosure further provides in some embodiments a computer-readable storage medium storing therein one or more programs including instructions. The instructions are executed by a portable electronic device including a plurality of applications so as to implement the method in FIG. 7, i.e., to: transmit a configuration parameter, the configuration parameter including first information indicating a correspondence between time-domain resources for URLLC uplink transmission and identifiers of HARQ processes; and upon the receipt of data for a URLLC service, cache the data for the URLLC service using a corresponding HARQ process on a time-domain resource for the URLLC uplink transmission on which the data for the URLLC service has been received.

In a word, the above embodiments are merely for illustrative purposes but shall not be construed as limiting the scope of the present disclosure. Any modifications, equivalents or improvements made without departing from the spirit and principle of the present disclosure will fall within the scope of the present disclosure.

The system, devices, modules or units mentioned hereinabove may be implemented through a computer chip or entity, or through a product having a certain function. Typically, they may be implemented as a computer. To be specific, the computer may be a personal computer, a laptop computer, a cellular phone, a camera phone, a smart phone, a Personal Digital Assistant (PDA), a media player, a navigation device, an E-mail device, a game console, a flat-panel computer, a wearable device, or a combination thereof.

The computer-readable storage medium may include volatile or non-volatile, mobile or immobile storage medium capable of storing therein information using any method or technique. The information may be a computer-readable instruction, a data structure, a program or any other data. The computer-readable storage medium may include, but not limited to, an RAM (e.g., Phase Change Random Access Memory (PRAM), SRAM or Dynamic Random Access Memory (DRAM)), an ROM (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

It should be further appreciated that, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The above embodiments have been described in a progressive manner, and the same or similar contents in the embodiments will not be repeated, i.e., each embodiment merely focuses on the difference from the others. Especially, because the system embodiments are substantially similar to the method embodiments, they have been described in a simple manner, and the relevant description may refer to that in the method embodiments.

What is claimed is:

1. An uplink grant-free transmission method in Ultra Reliable & Low Latency Communication (URLLC) performed by a terminal side device, comprising:
   receiving a configuration parameter, the configuration parameter comprising first information indicating a correspondence between time-domain resources for URLLC uplink transmission and identifiers of Hybrid Automatic Repeat reQuest (HARQ) processes; and transmitting, after the arrival of a URLLC service, data for the URLLC service using a corresponding HARQ process on an available time-domain resource for the URLLC uplink transmission, wherein the configuration parameter further comprises second information indicating a quantity of transmission times;

wherein the configuration parameter further comprises fourth information indicating redundancy versions of the data for the URLLC service transmitted each time and a transmission order of the redundancy versions or indicating redundancy versions of the data for the URLLC service on the time-domain resource for the URLLC uplink transmission corresponding to each HARQ process.

2. The uplink grant-free transmission method according to claim 1, wherein the transmitting data for the URLLC service using the corresponding HARQ process on the available time-domain resource for the URLLC uplink transmission after the arrival of the URLLC service comprises:

transmitting, after the arrival of the URLLC service, data for a first Transport Block (TB) using a first HARQ process corresponding to a first time-domain resource for the URLLC uplink transmission on a latest available first time-domain resource for the URLLC uplink transmission, and the first TB belongs to the data for the URLLC service, wherein the uplink grant-free transmission method further comprises: receiving scheduling information indicating that the data for the first TB transmission using the first HARQ process is to be retransmitted on a second time-domain resource for the URLLC uplink transmission.

3. The uplink grant-free transmission method according to claim 1, wherein the transmitting data for the URLLC service using the corresponding HARQ process on the available time-domain resource for the URLLC uplink transmission after the arrival of the URLLC service comprises:

transmitting, after the arrival of the URLLC service, data for a first TB using a first HARQ process corresponding to the first time-domain resource for the URLLC uplink transmission on the latest available first time-domain resource for the URLLC uplink transmission, the first TB belongs to the data for the URLCC service, and the data transmitted using the first HARQ process further carries third information indicating whether the first HARQ process through which the data for the URLLC service has been transmitted and an adjacent second HARQ process subsequent to the first HARQ process are used to transmit the data for the same TB.

4. The uplink grant-free transmission method according to claim 3, further comprising:

transmitting, subsequent to transmitting the data for the URLLC service using the corresponding HARQ process on the available time-domain resource for the URLLC uplink transmission, when the third information indicates that the first HARQ process and the second HARQ process are used to transmit the data for the same TB, the data for the first TB using the first HARQ process on all the time-domain resources for the URLLC uplink transmission corresponding to the second HARQ process.

5. The uplink grant-free transmission method according to claim 3, further comprising:

transmitting, subsequent to transmitting the data for the URLLC service using the corresponding HARQ process on the available time-domain resource for the URLLC uplink transmission, when the third information indicates that the first HARQ process and the second HARQ process are used to transmit the data for the same TB, the data for the first TB using the first HARQ process for the quantity of remaining transmission times on the time-domain resource for the URLLC uplink transmission corresponding to the second HARQ process, wherein the quantity of the remaining transmission times is the quantity of transmission times acquired by subtracting the quantity of transmission times of the first TB on the time-domain resource for the URLLC uplink transmission using the first HARQ process from the quantity of the transmission times indicated in the second information.

6. The uplink grant-free transmission method according to claim 1, wherein the transmitting data for the URLLC service using the corresponding HARQ process on the available time-domain resource for the URLLC uplink transmission after the arrival of the URLLC service comprises:

transmitting, after the arrival of the URLLC service and when a quantity of transmission times of one TB transmission using an HARQ process corresponding to a current time point is smaller than the configured quantity of transmission times, the data for the URLLC service using an adjacent HARQ process subsequent to the HARQ process corresponding to the current time point on a time-domain resource for the URLLC uplink transmission corresponding to the adjacent HARQ process.

7. An uplink grant-free transmission method in URLLC performed by a network side device, comprising:

transmitting a configuration parameter, the configuration parameter comprising first information indicating a correspondence between time-domain resources for URLLC uplink transmission and identifiers of HARQ processes; and caching, upon the receipt of data for the URLLC service, the data for the URLLC service using a corresponding HARQ process on a time-domain resource for the URLLC uplink transmission on which the data for the URLLC service has been received, wherein the configuration parameter further comprises second information indicating a quantity of transmission times;

wherein the configuration parameter is further used to indicate redundancy versions of the data for the URLLC service transmitted each time and a transmission order of the redundancy versions, or indicate redundancy versions of the data for the URLLC service on the time-domain resource for the URLLC uplink transmission corresponding to each HARQ process.

8. The uplink grant-free transmission method according to claim 7, wherein the caching the data for the URLLC service using the corresponding HARQ process on the time-domain resource for the URLLC uplink transmission on which the data for the URLLC service has been received upon the receipt of data for the URLLC service comprises:

caching, when it is detected that there is the data for the URLLC service to be received on a first time-domain resource for the URLLC uplink transmission, data for a first TB received on the first time-domain resource for the URLLC uplink transmission using a first HARQ process corresponding to the first time-domain resource for the URLLC uplink transmission, and the first TB belongs to the data for the URLLC service.

9. The uplink grant-free transmission method according to claim 8, further comprising:
transmitting, when the first TB cached using the first HARQ process has not been received correctly, scheduling information indicating that the data for the first TB cached using the first HARQ process is to be retransmitted by a terminal side device on a second time-domain resource for the URLLC uplink transmission.

10. The uplink grant-free transmission method according to claim 7, wherein the caching the data for the URLLC service using the corresponding HARQ process on the time-domain resource for the URLLC uplink transmission on which the data for the URLLC service has been received upon the receipt of data for the URLLC service comprises:
caching, when it is detected that there is the data for the URLLC service to be received on a first time-domain resource for the URLLC uplink transmission, data for a first TB received on a first time domain resource for the URLLC uplink transmission using a first HARQ process corresponding to the first time-domain resource for the URLLC uplink transmission,
wherein the first TB belongs to the data for the URLLC service, and the data for the URLLC service further carries third information indicating whether the first HARQ process and an adjacent second HARQ process subsequent to the first HARQ process are used to cache the data for the same TB.

11. The uplink grant-free transmission method according to claim 10, further comprising:
caching, subsequent to the caching the data for the URLLC service using the corresponding HARQ process on the time-domain resource for the URLLC uplink transmission on which the data for the URLLC service has been received upon the receipt of data for the URLLC service, when the third information indicates that the first HARQ process and the second HARQ process are used to cache the data for the same TB, the data for the first TB using the first HARQ process on all the time-domain resources for the URLLC uplink transmission corresponding to the second HARQ process.

12. The uplink grant-free transmission method according to claim 10, further comprising:
caching, subsequent to the caching the data for the URLLC service using the corresponding HARQ process on the time-domain resource for the URLLC uplink transmission on which the data for the URLLC service has been received upon the receipt of data for the URLLC service, when the third information indicates that the first HARQ process and the second HARQ process are used to cache the data for the same TB, the data for the first TB using the first HARQ process for the quantity of remaining transmission times on all the time-domain resources for the URLLC uplink transmission corresponding to the second HARQ process,
wherein the quantity of the remaining transmission times is the quantity of transmission times acquired by subtracting the quantity of transmission times of the first TB on the time-domain resource for the URLLC uplink transmission using the first HARQ process from the quantity of the transmission times indicated in the second information.

13. A terminal side device, comprising a processor, and a memory configured to store therein one or more computer-executable instructions, wherein the processor is configured to execute the one or more computer-executable instructions so as to implement an uplink grant-free transmission method in Ultra Reliable & Low Latency Communication (URLLC) for the terminal side device, comprising:
receiving a configuration parameter, the configuration parameter comprising first information indicating a correspondence between time-domain resources for URLLC uplink transmission and identifiers of Hybrid Automatic Repeat reQuest (HARQ) processes; and
transmitting, after the arrival of a URLLC service, data for the URLLC service using a corresponding HARQ process on an available time-domain resource for the URLLC uplink transmission,
wherein the configuration parameter further comprises second information indicating a quantity of transmission times;
wherein the configuration parameter further comprises fourth information indicating redundancy versions of the data for the URLLC service transmitted each time and a transmission order of the redundancy versions or indicating redundancy versions of the data for the URLLC service on the time-domain resource for the URLLC uplink transmission corresponding to each HARQ process.

14. The terminal side device according to claim 13, wherein the transmitting data for the URLLC service using the corresponding HARQ process on the available time-domain resource for the URLLC uplink transmission after the arrival of the URLLC service comprises:
transmitting, after the arrival of the URLLC service, data for a first Transport Block (TB) using a first HARQ process corresponding to a first time-domain resource for the URLLC uplink transmission on a latest available first time-domain resource for the URLLC uplink transmission, and the first TB belongs to the data for the URLLC service,
wherein the uplink grant-free transmission method further comprises: receiving scheduling information indicating that the data for the first TB transmission using the first HARQ process is to be retransmitted on a second time-domain resource for the URLLC uplink transmission.

15. The terminal side device according to claim 13, wherein the transmitting data for the URLLC service using the corresponding HARQ process on the available time-domain resource for the URLLC uplink transmission after the arrival of the URLLC service comprises:
transmitting, after the arrival of the URLLC service, data for a first TB using a first HARQ process corresponding to the first time-domain resource for the URLLC uplink transmission on the latest available first time-domain resource for the URLLC uplink transmission, the first TB belongs to the data for the URLCC service, and the data transmitted using the first HARQ process further carries third information indicating whether the first HARQ process through which the data for the URLLC service has been transmitted and an adjacent second HARQ process subsequent to the first HARQ process are used to transmit the data for the same TB.

16. A non-transitory computer-readable storage medium storing therein one or more programs, wherein the one or more programs are executed by an electronic device having a plurality of applications, so as to implement the uplink grant-free transmission method according to claim 1.

17. A network side device, comprising a processor, and a memory configured to store therein one or more computer-executable instructions, wherein the processor is configured to execute the one or more computer-executable instructions so as to implement the uplink grant-free transmission method according to claim 7.

18. The network side device according to claim 17, wherein the caching the data for the URLLC service using the corresponding HARQ process on the time-domain resource for the URLLC uplink transmission on which the data for the URLLC service has been received upon the receipt of data for the URLLC service comprises:

caching, when it is detected that there is the data for the URLLC service to be received on a first time-domain resource for the URLLC uplink transmission, data for a first TB received on the first time-domain resource for the URLLC uplink transmission using a first HARQ process corresponding to the first time-domain resource for the URLLC uplink transmission, and the first TB belongs to the data for the URLLC service.

19. The network side device according to claim 18, wherein the uplink grant-free transmission method further comprises:

transmitting, when the first TB cached using the first HARQ process has not been received correctly, scheduling information indicating that the data for the first TB cached using the first HARQ process is to be retransmitted by a terminal side device on a second time-domain resource for the URLLC uplink transmission.

20. A non-transitory computer-readable storage medium storing therein one or more programs, wherein the one or more programs are executed by an electronic device having a plurality of applications, so as to implement the uplink grant-free transmission method according to claim 7.

\* \* \* \* \*